US007694878B2

(12) United States Patent
Johnson

(10) Patent No.: US 7,694,878 B2
(45) Date of Patent: Apr. 13, 2010

(54) RFID CHECKOUT SYSTEM WITH TAGS

(75) Inventor: Michael J. Johnson, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 918 days.

(21) Appl. No.: 11/201,604

(22) Filed: Aug. 11, 2005

(65) Prior Publication Data

US 2007/0034692 A1 Feb. 15, 2007

(51) Int. Cl.
*G06K 15/00* (2006.01)

(52) U.S. Cl. ....................... 235/383; 235/375; 235/451; 340/571.1

(58) Field of Classification Search ......... 235/375–385; 340/571–574
See application file for complete search history.

(56) References Cited

U.S. PATENT DOCUMENTS

| | | | | |
|---|---|---|---|---|
| 6,415,978 | B1 * | 7/2002 | McAllister | 235/462.01 |
| 6,836,215 | B1 * | 12/2004 | Laurash et al. | 340/572.1 |
| 6,910,697 | B2 * | 6/2005 | Varatharajah et al. | 280/33.992 |
| 6,926,202 | B2 * | 8/2005 | Noonan | 235/385 |
| 7,150,395 | B1 * | 12/2006 | White | 235/383 |
| 2003/0018522 | A1 * | 1/2003 | Denimarck et al. | 705/14 |
| 2004/0050750 | A1 * | 3/2004 | Hannan et al. | 206/570 |
| 2005/0162277 | A1 * | 7/2005 | Teplitxky et al. | 340/572.8 |
| 2008/0055089 | A1 * | 3/2008 | Gustafsson | 340/572.1 |

* cited by examiner

*Primary Examiner*—Seung H Lee
*Assistant Examiner*—Christle I Marshall
(74) *Attorney, Agent, or Firm*—Jason O. Piche, Esq.; Steven M. Greenberg, Esq.; Carey, Rodriguez, Greenberg & Paul, LLP

(57) ABSTRACT

A radio frequency identification (RFID) checkout system includes a reader, a first RFID tag, and a second RFID tag. The first tag is configured to be attached to an item selected to not be read by the reader, and the second tag is configured to be attached to an item selected to be read by the reader. Upon items being positioned within the reader, the reader reads the tags to determine if the first tag is present within the reader. The reader is enabled to complete a checkout transaction if no first tags are detected within the reader during the reading. The first tag includes an attachment base, an extension portion connected to the attachment base, and a RFID antenna connected to the extension portion. The extension portion is movable relative to the attachment base between at least a first position and a second position, and the extension portion extends away from the attachment base in the first position.

21 Claims, 3 Drawing Sheets

RFID CHECKOUT SYSTEM WITH TAGS

BACKGROUND OF THE INVENTION

1. Field of the Invention

The disclosure relates generally to checkout systems and, more specifically, to a checkout system that is capable of handling items that are not compatible with RFID tags.

2. Description of the Related Art

Many retailers have attempted to reduce expenses by streamlining operations at checkout. Typically, a checkout clerk either manually types in the price of an item to be purchased or scans the barcode on the item at a register checkout station. More recently, these register checkout stations, which have been staffed by an employee of the retailer, have been replaced by self-checkout stations. The self-checkout stations reduce expenses for the retailers while offering convenience and time savings to customers.

An issue with the self-checkout station, however, is that the customer still has to individually scan each item. The process of scanning each item is time-consuming, particularly if the consumer has many items. The type of customer that purchases large quantities of items is the "big ticket" type of customer that retailers want to encourage to return. However, this is also the same type of customer that is required to spend the most amount of time at a register checkout station, no matter if the checkout station is staffed or a self-checkout station.

One solution, which is currently being considered, employs the use of radio-frequency identification (RFID). A RFID tag/attachment can be placed on each item, and when read, the RFID tag can include specific information about the item, such as price, identification, expiration date, serial number, etc. By placing a RFID tag on each item to be read, an entire lot/cart of items can be scanned at once, which considerably decreases the time required to read a large number of items, as compared to individually scanning each item.

An issue that arises with using RFID tags to read large numbers of items at once is that many items may not be entirely compatible with RFID reading. Items that reflect, scatter, block or attenuate the radio waves used with RFID may prevent some items from being read by the RFID reader. Examples of these types of items include metals items, such as soup and pie pans, and liquid items, such as juice and liquid laundry soap. To compensate for this issue, attempts have been made to change certain system variables, such as RF frequency and power, scan rate, and number of RF receivers, to reduce the number of incompatible items. However, none of these changes have been able to completely reduce the incidence of incompatible items. There is, therefore, a need for a RFID-based checkout system to be able to handle RFID incompatible items.

BRIEF SUMMARY OF THE INVENTION

Embodiments of the invention address deficiencies of the art in respect to checkout systems and provide a novel and non-obvious system, method, program and tag for detecting RFID-incompatible items. A RFID checkout system includes a reader, a first RFID tag, and a second RFID tag. The first tag is configured to be attached to an item selected to not be read by the reader, and the second tag is configured to be attached to an item selected to be read by the reader. Upon items being positioned within the reader, the reader reads the tags to determine if the first tag is present within the reader. The reader is enabled to complete a checkout transaction if no first tags are detected within the reader during the reading.

The first tag includes an attachment base, an extension portion connected to the attachment base, and a RFID antenna connected to the extension portion. The extension portion is movable relative to the attachment base between at least a first position and a second position, and the extension portion extends away from the attachment base in the first position.

In additional aspects of the first tag, the extension portion is biased to move into the first position. Also the attachment base is configured to be attachable to the item selected to not be read by the reader. The first tag includes indicia indicating to a user of the checkout system that the item, to which the first tag is attached, is to not be read by the reader. The indicia may be a color of the first tag.

In additional aspects of the checkout system, the checkout system includes a cart that is adapted to be received by the reader. The cart also includes a first compartment and a second compartment. The first compartment receives the item selected to not be read by the checkout system. The first compartment includes a color that matches the color of the indicia of the first tag.

In yet another aspect of the checkout system, each first tag provides, to the reader, at least one output having identical information. The reader determines that the first tag is within the reader upon reading the at least one output having the identical information.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Figure 1:
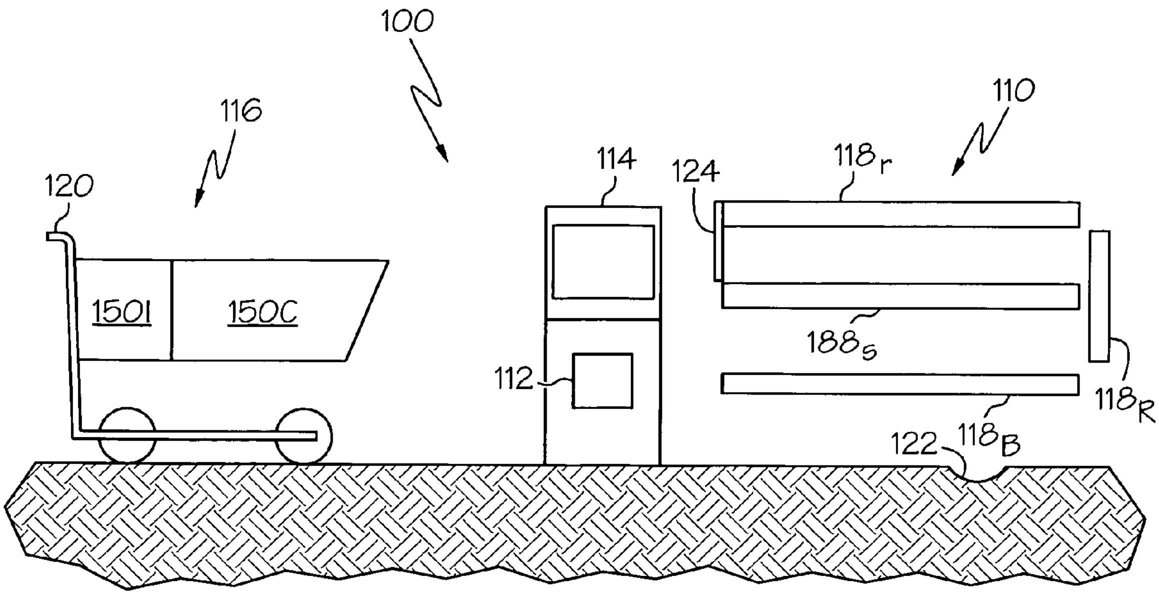
FIG. 1 is a schematic illustration of a RFID checkout system in accordance with the inventive arrangements.
Figure 2A:
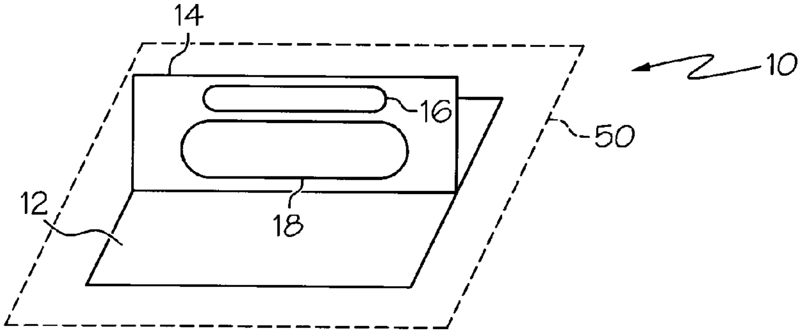
FIGS. 2A and 2B are perspective illustrations of a RFID tag in two different positions.
Figure 2B:
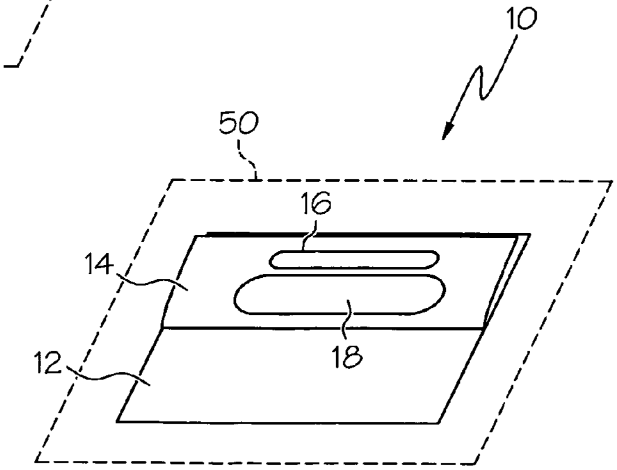

FIGS. 1 and 2A-2B respectively illustrate a RFID checkout system 100 for handling RFID incompatible items and a RFID tag 10 to be placed on the RFID incompatible items. The checkout system 100 includes a RFID reader 110 that is configured to receive and read RFID tagged items and a computer system 112 that is connected to the reader 110. The checkout system 100 may also include an input/output device 114 for receiving input from a user and/or providing the user with information/instructions.

The reader 110 includes one or more RFID receivers 118 that read a RFID antenna 16 on the RFID tag 10 for incompatible items and a RFID antenna of the RFID tag (not shown) for compatible items. Many types and numbers of receivers 118 are known to be capable of reading a RFID antenna 16, and the checkout system 100 is not limited as to a type/number of receivers 118. In certain aspects of the check system 100, the reader 110 includes both top and bottom receivers $\mathbf{118}_T$, $\mathbf{118}_B$ in addition to side and rear receivers $\mathbf{118}_S$, $\mathbf{118}_R$.

The computer system 112 controls the operation of the reader 110 and receives the information provided by the RFID tags 10. The checkout system 100 is not limited to a particular type of computer system 112 or where the computer system 112 is located. For example, the computer system 112, or portions thereof, may be located remote from the reader 110 and/or portions of the computer system 112 may be included within the reader 112. For purposes of discussion, the computer system 112 is considered to be part of the input/output device 114.

Many types of input/output devices 114 are known to be capable of being used in checkout systems, and the present checkout system 100 is not limited as to a particular type of input/output devices 114. For example, the input/output device 114 may be separate devices, such as a keypad and a video display, or the input/output device 114 may be combined into a single unit such as a video touchpad.

The checkout system 100 is not limited in the manner in which the RFID tagged items are introduced into the reader 110. For example, all of the RFID tagged items may be placed on a conveyor belt (not shown) that conveys the items into the reader 110. In certain aspects of the checkout system 100, the reader 110 is configured to receive a cart 116 in which the RFID tagged items are placed.

Depending upon the specific configuration of the cart 116, the arrangement of the reader 110 may change. For example, if certain portions of the cart 116 are RFID incompatible (e.g., being formed from metal), the receivers 118 of the reader 110 may be positioned relative to the RFID incompatible portion, such as a frame 120, of the cart 116 to prevent interference by the RFID incompatible portion. Also, the reader 110 may include one or more stops 122, such as detent in the floor, that aids the user in determining that the cart 116 is correctly positioned within the reader 110. A curtain 124 may also be included with the reader 110 to provide the user with an indication that the cart 116 has been correctly positioned within the reader 110 and to inhibit manipulation of the contents of the cart 116 during the read operation.

In certain aspects of the checkout system 100, portions of the cart 116 that are inside the reader 110 during scanning may be formed from a RFID compatible material, such as plastic. Also, the cart 116 may be separated into two separate sections: a section 150I for RFID incompatible items and a section 150C for RFID compatible items. Either of these sections or both of these sections 150I, 150C may be removable from the cart 116, which allows for easy separation of the RFID incompatible items from the RFID compatible items. Alternatively, both of the sections 150I, 150C may not be removable from the cart 116.

Referring to FIGS. 2A and 2B, a RFID tag 10 to be placed on a RFID incompatible items is shown. Although the RFID incompatible item 50 is not intended to be read by the reader 110, the RFID tag 10 is configured to be more easily read by the reader 110 upon the RFID incompatible item 50 being inadvertently placed within the reader 110.

Although the RFID tag 10 for use with the checkout system 100 is not limited to a specific type of RFID tag 10, in certain aspects of the RFID tag 10, the RFID tag 10 includes an attachment base 12 and an extension portion 14 that is connected to the attachment base 12. The extension portion 14 is movable relative to the attachment base 12 between at least a first position (e.g., FIG. 2A) and a second position (e.g., FIG. 2B). The extension portion 14 is attached to a RFID antenna 16 that is configured to be read by the reader 110 of the checkout system 100. The RFID antenna 16 may be selected to provide, to the receiver, a specific output, such as a string of zeroes or ones, that the reader 110 of the checkout system 100 recognizes as identifying an incompatible item 50. Although the RFID antenna 16 may include information specific to the incompatible item 50, in certain current aspects of the RFID tag 10, at least one output provided by the RFID antenna 16 to the reader 110 of the checkout system is identical for all the RFID tags 10 used by the checkout system 100.

The attachment base 12 is configured to be attachable to the RFID incompatible item 50. Many types of systems/devices are known to be capable of attaching a tag to an item, and manner in which the attachment base 12 is attached to the RFID incompatible item 50 is not limited as to a particular type of system/device. For example, an under portion of the attachment base 12 may include a sticky substance that attaches to the RFID incompatible item 50 upon the under portion of the attachment base 12 being placed upon the RFID incompatible item 50.

In the first position of the extension portion 14, the extension portion 14 is positioned away from the attachment base 12 and, thus, the RFID incompatible item 50. In so doing, a greater likelihood exists that the RFID antenna 16 attached to the extension portion 14 will be read by the reader 110 of the checkout system 100 as compared to a configuration in which the RFID antenna 16 is placed in close proximity to the RFID incompatible item 50.

In the second position of the extension portion 14, the extension portion 14 is positioned proximate to the attachment base and, thus, the RFID incompatible item 50. In so doing, a lesser likelihood exists that the extension portion 14 will interfere with the close packing of certain RFID incompatible items 50, such as cans, as compared to a configuration in which the extension portion 14 rigidly extends away from the attachment base 12.

The manner in which the extension portion 14 is movable between the first and second positions is not limited. For example, a hinge (not shown) can connect the extension portion 14 to the attachment base 12. In certain aspects of the RFID tag 10, the extension portion 14 is formed from a flexible material that can be flexed/bent between the first and second positions.

The extension portion 14 of the RFID tag 10 may also be biased towards the first position such that when no external force is placed on the extension portion 14, the extension portion 14 moves into the first position. The manner in which the extension portion 14 is biased towards the first position is not limited. For example, a biasing member (not shown), such as a spring, may be connected to the extension portion 14 to bias the extension portion 14 into the first position. In certain aspects of the RFID tag 10, the extension portion 14 is biased into the first position using the elasticity of the material used to form at least a portion of the extension portion 14.

The RFID tag 10 may also include indicia 18 that indicates to the user that the item 50 to which the RFID tag 10 is attached should be separated from RFID compatible items before the items are read. This indicia 18 may be in the form of writing, such as "NOT COMPATIBLE WITH WHOLE CART SCAN" and/or with the use of an easily distinguishable color, such as a bright orange. Also, the section 150I of the cart 116 used for RFID incompatible items may also be in the same or similar color to that of the RFID tag 10. In this manner, a user, upon identifying the colored RFID tag 10 on the RFID incompatible item 50, recognizes that the RFID incompatible item 50 is to be placed in the section 150I of the cart 116 that is colored to match the color of the RFID tag 10.

The RFID tag 10 for RFID incompatible items is configured to be different than the RFID tag (not shown) for items intended to be read by the reader 110. The manner in which the RFID tag 10 is different is not limited. For example, the difference may result in the inclusion of the indicia 18 with the RFID tag 10. By having this difference between the two tags, a user is better able to distinguish between and separate items 50 not intended to be read by the reader 110 from those items intended to be read by the reader 110.

Figure 3:
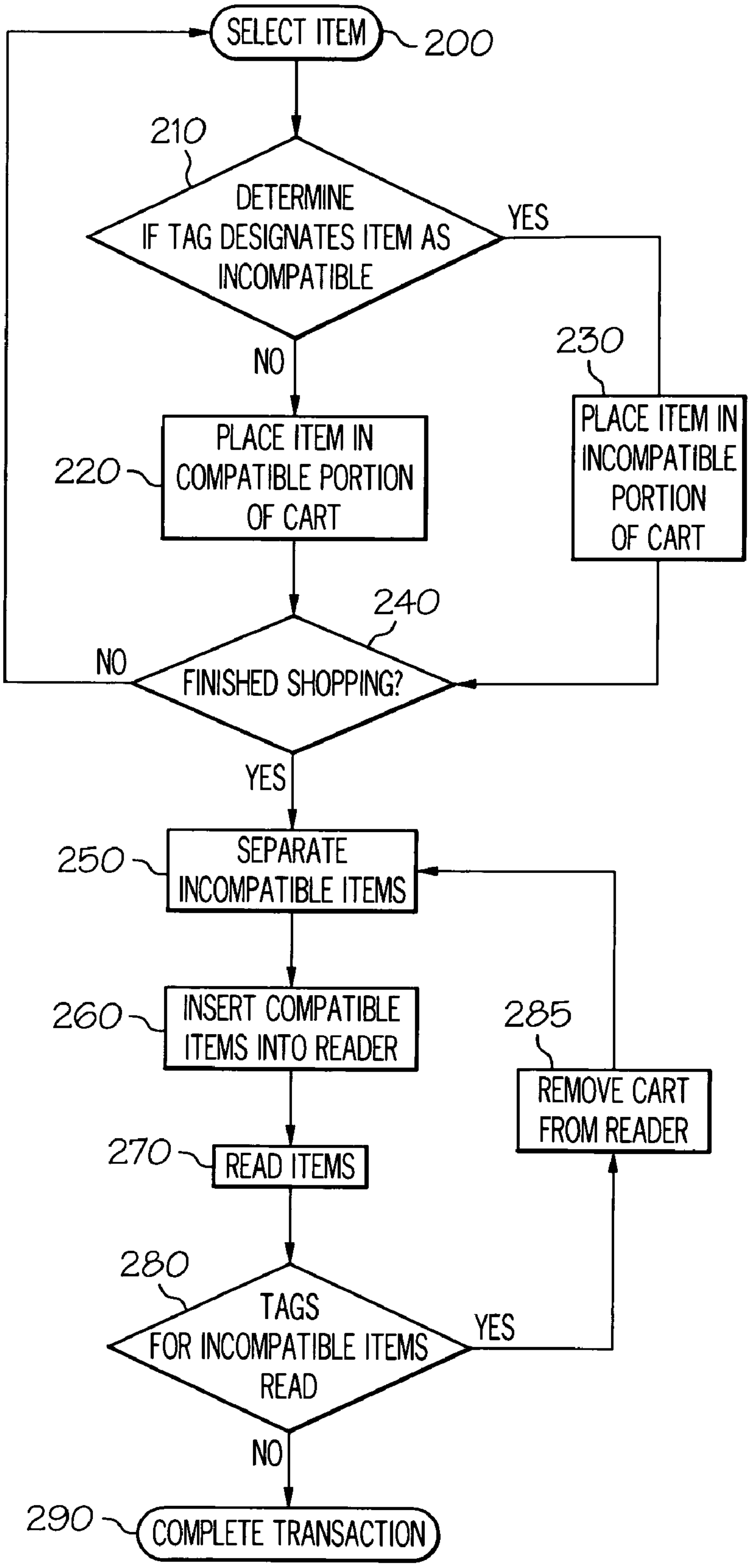
FIG. 3 is a flow chart illustrating a process for a user operating the RFID checkout system.
Figure 4:
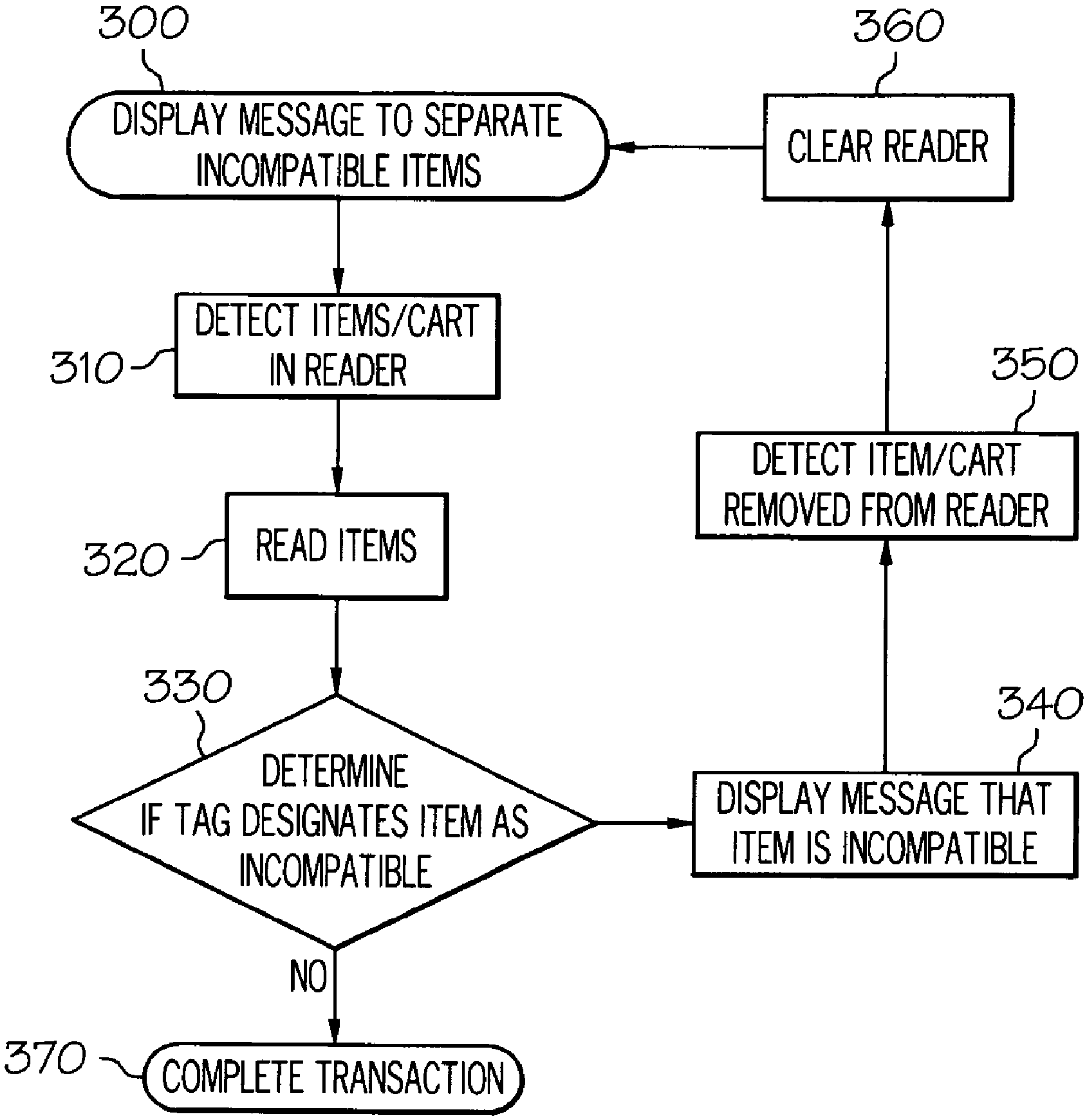
FIG. 4 is a flow chart illustrating a process performed by the RFID checkout system.

FIGS. 3 and 4 illustrate methods in which the checkout system 100 is operated. Specifically, FIG. 3 illustrates certain steps performed by the user of the checkout system 100, and FIG. 4 illustrates certain steps performed by the checkout system 100. In step 200 the user selects an item, and in step 210 the user determines if the item has a RFID tag 10 that indicates that the item is incompatible with whole cart reading. If the item includes the RFID tag 10, in step 230, the item 50 is placed into the section 150I of the cart 116 used for incompatible items, and if the item does not include the RFID tag 10, in step 220, the item is placed into the section 150C of the cart 116 used for compatible items.

In step 240, the user either decides to continue shopping, and thus repeat steps 200-240, or the user decides to read the selected items. Upon reaching the checkout station of the checkout system 100, in step 300, the input/output device 114 indicates to user (e.g., by displaying a message) that the incompatible items 50 should be separated from the compatible items before reading. In step 250, the incompatible items 50 are separated from the compatible items, for example, by removing the incompatible items 50 from the cart 100. In step 260, the compatible items are placed into the reader 110, and in step 310, the checkout system 100 determines that the cart 116 is properly positioned within the reader 110. In step 270, 320, the RFID antennas on the compatible items are read by the reader 110.

In step 280, 330 the checkout system 100 determines if any RFID tags 10 used for incompatible items 50 have been read. If RFID tags 10 for incompatible items 50 have been read, in step 340, the input/output device 114 indicates to an user (e.g., by displaying a message and/or with an audible alarm) that the incompatible items 50 should be separated from the compatible items. After the checkout system 100 detects that the cart 116 has been removed from the reader 110, step 350, and the reader 110 has been cleared, step 360, the user repeats steps 250-280 (and the checkout system repeats steps 300-330) until no RFID tag 10 for an incompatible item 50 is detected during reading.

In step 290, 370, upon a determination being made that no RFID tag 10 for an incompatible item 50 has been detected during reading, the checkout transaction can be completed. This may include, for example, reading/scanning any incompatible items 50 using a separate system and/or method, which may occur before or after the RFID compatible items have been read.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

What is claimed is:

1. A radio frequency identification (RFID) checkout system, comprising:
- a reader for reading items;
- a first RFID tag configured to be attached to an item selected to not be processed automatically by the reader;
- a second RFID tag configured to be attached to an item selected to be processed automatically by the reader, wherein
- upon items being positioned within the reader, the reader reading the tags to determine if the first tag is present within the reader, and
- the reader is enabled to complete a checkout transaction if no first tags are positioned within the reader during the reading.

2. The checkout system according to claim 1, wherein the first tag includes:
- an attachment base configured to be attached to the item selected to not be processed automatically by the RFID checkout system,
- an extension portion connected to the attachment base; and
- a RFID antenna connected to the extension portion, wherein
- the extension portion is movable relative to the attachment base between at least a first position and a second position, and
- the extension portion extending away from the attachment base in the first position.

3. The checkout system according to claim 2, wherein the extension portion is biased to move into the first position.

4. The checkout system according to claim 1, wherein the first tag includes indicia indicating to a user of the checkout system that the item, to which the first tag is attached, is not intended to be processed automatically by the reader.

5. The checkout system according to claim 4, wherein the indicia is a certain color for the first tag.

6. The checkout system according to claim 5, further comprising a cart adapted to be received by the reader and including a first compartment and a second compartment.

7. The checkout system according to claim 6, wherein the first compartment receives the item selected to not be processed automatically by the RFID checkout system and the first compartment includes the color that matches the color of the indicia of the first tag.

8. The checkout system according to claim 1, wherein each first tag provides at least one output having identical information.

9. The checkout system according to claim 8, wherein the reader determines that the first RFID tag is within the reader upon reading the at least one output having identical information.

10. A method for identifying radio frequency identification tags (RFID) tags on items selected to not be processed automatically by a reader of a RFID checkout system, comprising the steps of:

reading outputs from RFID tags on the items within a reader;

comparing each read output to a predetermined output indicating an item selected to not be processed automatically by the reader;

upon detecting the predetermined output, indicating to a user that the item selected to not be processed automatically by the reader is within the reader; and enabling the checkout system to complete a checkout transaction if the predetermined output has not been read during the reading step.

11. The method according to claim 10, farther comprising determining that items to be processed automatically are positioned within the reader prior to the reading of the outputs.

12. The method according to claim 11, farther comprising determining that the read items having the predetermined output have been removed from the reader after the indicating to the user that the item selected to not be processed automatically by the reader is within the reader.

13. The method according to claim 12, further comprising resetting the reader to enable the reader to read items within the reader after the determination that the read items having the predetermined output have been removed from the reader.

14. A computer program product comprising a computer useable medium including a computer readable program, wherein the computer readable program when executed on a computer causes a radio frequency identification (RFID) checkout system to identify RFID tags on items selected to not be processed automatically by a reader of the RFID checkout system, comprising the steps of:

reading outputs from RFID tags on items within a reader;

comparing each read output to a predetermined output indicating an item selected to not be processed automatically by the reader;

upon detecting the predetermined output, indicating to a user that the item selected to not be processed automatically by the reader is within the reader; and completing a checkout transaction if the predetermined output has not been read during the reading step.

15. The method according to claim 14, further comprising determining that items to be processed automatically are positioned within the reader prior to the reading of the outputs.

16. The method according to claim 15, further comprising determining that the read items having the predetermined output have been removed from the reader after the indicating to the user that the item selected to not be processed automatically by the reader is within the reader.

17. The method according to claim 16, further comprising resetting the reader to enable the reader to read items within the reader after the determination that the read items having the predetermined output have been removed from the reader.

18. A radio frequency identification (RFID) tag for use with a RFID checkout system, comprising:

an attachment base configured to be attached to an item selected to not be processed automatically by the RFID checkout system;

an extension portion, not attached to the item, connected to the attachment base; and a RFID antenna connected to the extension portion, wherein the extension portion is movable relative to the attachment base, upon the RFID tag being completely attached to the item, between at least a first position and a second position, and the extension portion extending away from the attachment base in the first position.

19. The RFID tag according to claim 18, the extension portion is biased to move into the first position.

20. The RFID tag according to claim 18, wherein the tag includes indicia indicating to a user of the checkout system that the item, to which the tag is attached, is not intended to be processed automatically by the reader.

21. The RFID tag according to claim 20, wherein the indicia is a certain color for the tag.

* * * * *